UNITED STATES PATENT OFFICE.

EUSEBIUS BRUUN, OF SVENDBORG, DENMARK.

PREPARING PRESSED YEAST.

SPECIFICATION forming part of Letters Patent No. 439,834, dated November 4, 1890.

Application filed January 16, 1890. Serial No. 337,155. (No specimens.)

*To all whom it may concern:*

Be it known that I, EUSEBIUS BRUUN, a subject of the King of Denmark, and residing at Svendborg, in the Kingdom of Denmark, have invented certain new and useful Improvements in the Manufacture of Yeast; and I do hereby declare the following to be a full, clear, and exact description of the invention, such as will enable others skilled in the art to which it appertains to make and use the same.

The process has for its object the production of pressed yeast of best quality—that is to say, with the best color, greatest possible leavening power, and durability—and this, too, in such quantities that it allows of the simultaneous manufacture of spirit, though either can be entirely dispensed with or reduced to such a small quantity that as compared with the quantity of yeast produced it becomes an additional or secondary product, and yet with much greater pecuniary advantage than by the old method, in which the spirit was the main and the yeast the secondary product.

As raw material all kinds of grain can be used, governed by the local prices, with or without adding malt germs, wheat bran, or other substances containing nitrogen. The main substance—seventy-five per cent. of the raw material—is taken from barley, rye, or maize, according to the local prices. The corn or grain is washed, malted, and ground. Five per cent. is taken of barley or buckwheat and twenty per cent. of rye or maize; but these twenty-five per cent. are used in unmalted state, but soaked so that they can be ground like green malt on an ordinary malt-mill with two rollers. The thus divided grain is left soaking in water, with a slight amount of muriatic acid added, for twenty-four hours, and is then left in the ordinary manner for formation of maltose, and through various treatments—such as filtration through its own husks (mash) and subsequent passage through a system of sieves of different mesh—is either conveyed direct to the fermenting-chambers or subjected to a further filtration either through bone-black by the aid of steam-pressure or through silicious earth or other similar inorganic substances cold, whereby is obtained an almost colorless fluid of about ten per cent. saccharometer. This fluid should have a temperature of about 30° Celsius, to which it is reduced by cooling, and partly by cooling and partly by addition of steam this temperature is sustained through the whole period of fermentation, which is advanced by the introduction of air, whereby the fermentation is completed in about ten hours. As added yeast, ordinary yeast is used, dissolved in water at 30° Celsius. After fermentation is finished the yeast is separated from the fermented fluid either by precipitation or a centrifuge, cleaning and pressing as usual. If a simultaneous production of spirit be wanted, this is attained in the usual manner by distilling the fluid which remains after precipitation or the centrifugal process.

Having thus described my invention, what I desire to claim, and secure by Letters Patent, is—

A process for the manufacture of pressed yeast, consisting in subjecting the greater portion of the material (grain, residue of grain, bran, and malt-germs) from which the yeast is to be produced to a moistening and malting process and the smaller portion only a moistening, the coloring substance of the outside portions of the raw materials being removed by moistening, after which the moistened grain is ground, mixed with water, and left standing with or without addition of inorganic acids for the purpose of peptonizing, steamed, mashed, and transformed to maltose, after which the mash is filtered through a series of sieves, increasing in fineness, or a suitable inorganic substance, as bone-black or the like, and the filtered substance placed in a fermenting-vessel fitted with ventilating appliances, where it is kept at a constant temperature during fermentation, and finally separating the yeast which has been formed from the wort by precipitation or centrifugal separation.

In testimony whereof I affix my signature in presence of two witnesses.

EUSEBIUS BRUUN.

Witnesses:
VALDEMAR CHRISTIAN
           THORVALD JENSEN,
HANS JÖRGEN RASMÜSSEN,
*Clerks in the office of the Notary Public.*